United States Patent
Joseph et al.

(10) Patent No.: US 11,561,547 B2
(45) Date of Patent: Jan. 24, 2023

(54) AUTONOMOUS VEHICLE ROUTING BASED UPON SPATIOTEMPORAL FACTORS

(71) Applicant: GM Cruise Holdings LLC, San Francisco, CA (US)

(72) Inventors: Antony Joseph, San Francisco, CA (US); Geoffrey Louis Chi-Johnston, San Francisco, CA (US); Vishal Suresh Vaingankar, Kensington, CA (US); Laura Athena Freeman, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 751 days.

(21) Appl. No.: 16/280,415

(22) Filed: Feb. 20, 2019

(65) Prior Publication Data
US 2020/0264619 A1  Aug. 20, 2020

(51) Int. Cl.
*G05D 1/02* (2020.01)
*G01C 21/20* (2006.01)
(Continued)

(52) U.S. Cl.
CPC .......... *G05D 1/0214* (2013.01); *G01C 21/20* (2013.01); *G01C 21/3484* (2013.01);
(Continued)

(58) Field of Classification Search
CPC ......... G05D 2201/0213; G05D 1/0088; G05D 1/0214; G05D 1/0276; G05D 1/0061;
(Continued)

(56) References Cited

U.S. PATENT DOCUMENTS 8,103,435 B2   1/2012  Yang et al.
8,731,808 B2   5/2014  Tashiro et al.
(Continued)

FOREIGN PATENT DOCUMENTS

| CN | 107300916 A | * | 10/2017 | .......... B60W 30/095 |
| WO | 2010072195 A2 | | 7/2010 | |
| WO | WO-2019108213 A1 | * | 6/2019 | ............ B60W 30/08 |

*Primary Examiner* — Redhwan K Mawari
(74) *Attorney, Agent, or Firm* — Calfee, Halter & Griswold LLP

(57) ABSTRACT

Various technologies described herein pertain to routing autonomous vehicles based upon spatiotemporal factors. A computing system receives an origin location and a destination location of an autonomous vehicle. The computing system identifies a route for the autonomous vehicle to follow from the origin location to the destination location based upon output of a spatiotemporal statistical model. The spatiotemporal statistical model is generated based upon historical data from autonomous vehicles when the autonomous vehicles undergo operation-influencing events. The spatiotemporal statistical model takes, as input, a location, a time, and a direction of travel of the autonomous vehicle. The spatiotemporal statistical model outputs a score that is indicative of a likelihood that the autonomous vehicle will undergo an operation-influencing event due to the autonomous vehicle encountering a spatiotemporal factor along a candidate route. The autonomous vehicle then follows the route from the origin location to the destination location.

20 Claims, 12 Drawing Sheets

(51) Int. Cl.
*G01C 21/36* (2006.01)
*G05D 1/00* (2006.01)
*G01C 21/34* (2006.01)

(52) U.S. Cl.
CPC ....... *G01C 21/3691* (2013.01); *G05D 1/0011* (2013.01); *G05D 1/0061* (2013.01)

(58) Field of Classification Search
CPC .. G05D 1/0011; G05D 1/0022; G05D 1/0027; G05D 1/0038
See application file for complete search history.

(56) References Cited

U.S. PATENT DOCUMENTS

| | | | |
|---|---|---|---|
| 9,222,791 B2 | 12/2015 | Delling et al. | |
| 9,989,369 B2* | 6/2018 | Glasgow | G08G 1/012 |
| 10,403,133 B1* | 9/2019 | Christensen | G01C 21/3492 |
| 10,825,340 B1* | 11/2020 | Floyd | G05D 1/0214 |
| 2015/0279210 A1* | 10/2015 | Zafiroglu | G08G 1/143 340/932.2 |
| 2017/0166123 A1* | 6/2017 | Bahgat | B60W 30/0953 |
| 2018/0150081 A1 | 5/2018 | Gross et al. | |
| 2018/0224860 A1* | 8/2018 | Warshauer-Baker | G05D 1/0088 |
| 2019/0213873 A1* | 7/2019 | Adireddy | G08G 1/0116 |
| 2019/0266567 A1* | 8/2019 | Borucki | G06Q 10/0832 |
| 2019/0354111 A1* | 11/2019 | Cheng | G05D 1/0027 |
| 2020/0073382 A1* | 3/2020 | Noda | G05D 1/0088 |
| 2020/0097808 A1* | 3/2020 | Thomas | G06N 3/0445 |
| 2020/0098269 A1* | 3/2020 | Wray | G05D 1/0212 |
| 2020/0117200 A1* | 4/2020 | Akella | G05D 1/0088 |
| 2020/0192351 A1* | 6/2020 | Rastoll | G05D 1/0027 |
| 2020/0193311 A1* | 6/2020 | Myers | G06N 5/045 |
| 2020/0264619 A1* | 8/2020 | Joseph | G08G 1/0129 |
| 2020/0400086 A1* | 12/2020 | Pati | G05D 1/0088 |
| 2021/0116907 A1* | 4/2021 | Altman | H04W 4/44 |

* cited by examiner

AUTONOMOUS VEHICLE ROUTING BASED UPON SPATIOTEMPORAL FACTORS

BACKGROUND

An autonomous vehicle is a motorized vehicle that can operate for extended distances and/or periods of time without a human operator (i.e., a driver). An exemplary autonomous vehicle includes a plurality of sensor systems, such as but not limited to, a lidar sensor system, a camera sensor system, and a radar sensor system, amongst others. The autonomous vehicle operates based upon sensor data output by the sensor systems.

Typically, an autonomous vehicle operates autonomously (i.e., without conduction by the human operator) along a route from an origin location to a destination location. However, in certain driving scenarios, the autonomous vehicle may be caused to cease operating autonomously and instead be controlled by a human. Further, in some situations, the autonomous vehicle may be caused to perform an unplanned maneuver along the route in order to arrive at the destination location. Furthermore, the autonomous vehicle may also be subjected to events along the route that, while not altering behavior of the autonomous vehicle itself, may still be undesirable.

Conventionally, autonomous vehicles tend to be routed from an origin location to a destination location based upon predefined metrics, such as travel time between the origin location and the destination location, travel distance between the origin location and the destination location, etc. Autonomous vehicles may also be routed based on predefined operational factors such as distance to or distance from a charging station or a gas station. Using only these predefined metrics and factors to determine a route, however, may result in a suboptimal experience for a passenger in the autonomous vehicle.

SUMMARY

The following is a brief summary of subject matter that is described in greater detail herein. This summary is not intended to be limiting as to the scope of the claims.

Described herein are various technologies that pertain to routing of an autonomous vehicle based upon a risk of the autonomous vehicle undergoing an operation-influencing event. More specifically, described herein is a computer-implemented spatiotemporal statistical model that is configured to output a score that is indicative of a likelihood of the autonomous vehicle undergoing an operation-influencing event due to the autonomous vehicle encountering a spatiotemporal factor along a route. The autonomous vehicle (or a separate computing system) may identify the route for the autonomous vehicle to follow from an origin location to a destination location based upon the score. The autonomous vehicle may then follow the route from the origin location to the destination location.

In operation, a computing system receives an origin location of an autonomous vehicle and a destination location of the autonomous vehicle. In one embodiment, the computing system is comprised by the autonomous vehicle. In another embodiment, the computing system is separate from the autonomous vehicle (e.g., a server computing device).

The computing system then identifies a route for the autonomous vehicle to follow from the origin location to the destination location based upon output of a computer-implemented spatiotemporal statistical model. The spatiotemporal statistical model is generated based upon historical data from autonomous vehicles when the autonomous vehicles undergo operation-influencing events while the autonomous vehicles encounter spatiotemporal factors in driving environments. The historical data comprises indications of geographic locations traversed by the autonomous vehicles, indications of spatiotemporal factors in the geographic locations, and times at which the autonomous vehicles encountered the spatiotemporal factors.

Exemplary operation-influencing events include a human operator taking control of the autonomous vehicle (either from within the autonomous vehicle or from a remote station), deceleration of an autonomous vehicle exceeding a threshold, a change in deceleration ("jerk") of an autonomous vehicle exceeding a threshold, a change in yaw rate of an autonomous vehicle exceeding a threshold, an unplanned maneuver of an autonomous vehicle while traversing a route, an object being within a threshold distance from of an autonomous vehicle, amongst others.

Exemplary spatiotemporal factors include an incidence of an emergency vehicle (e.g., a fire trucks, a police car, etc.), an incidence of steam (whether natural or human generated, for instance, by manhole covers), an incidence of double-parked vehicles, an incidence of a high volume of pedestrians, an incidence of a high volumes of cyclists, an incidence of a high volume of vehicular traffic, an incidence of an inclement weather condition (e.g., rain, strong wind, fog), an incidence of debris in a road (e.g., traffic cones, garbage), an incidence of lighting conditions primarily determined by a time of day (e.g., bright sunlight, low sunlight, no sunlight, diffuse sunlight), incidence of lighting conditions primarily determined by made-made objects (e.g., high volumes of fluorescent light relative to ambient light), an incidence of vegetation occluding a roadway (e.g., overhanging trees), an incidence of roadway features obstructing the sight lines of the autonomous vehicle (e.g., signs in the median of the road, garbage cans, etc.), an incidence of roadway features that cannot be navigated through without accommodation (e.g., potholes, road construction, sharp turns, intersections with high curvatures), an incidence of high volumes of other autonomous vehicles, etc., wherein such factors occur at certain locations and times.

The computer-implemented spatiotemporal statistical model takes, as input, a location, a time, and a direction of travel of the autonomous vehicle along a candidate route from the origin location to the destination location. The spatiotemporal statistical model outputs a score that is indicative of a likelihood that the autonomous vehicle will undergo an operation-influencing event due to the autonomous vehicle encountering a spatiotemporal factor along the candidate route. In an example, the computing system may select the route such that the expected travel time to the destination location is balanced against a likelihood of the autonomous vehicle undergoing an operation-influencing event during the route. The computing system identifies the route based upon the score.

When the computing system is separate from the autonomous vehicle, the computing system transmits the route to the autonomous vehicle over a network. The autonomous vehicle then controls at least one of a vehicle propulsion system of the autonomous vehicle, a braking system of the autonomous vehicle, or a steering system of the autonomous vehicle such that the autonomous vehicle follows the route from the origin location to the destination location responsive to the computing system identifying the route.

The above-described technologies present various advantages over conventional computer-implemented routing approaches for autonomous vehicles. First, an autonomous vehicle may employ the above-described technologies in order to balance a likelihood of the autonomous vehicle undergoing an operation-influencing event with spatiotemporal factors, as well as other factors (e.g., travel time, travel distance, etc.) in a driving environment of the autonomous vehicle. Second, even when a human operator is not present in the autonomous vehicle, the autonomous vehicle may utilize the above-described technologies in order to avoid potentially challenging driving scenarios. Third, the above-described technologies may also be employed to increase exposure of the autonomous vehicle to spatiotemporal factors that cause the autonomous vehicle to undergo operation-influencing events in order to assist in training the autonomous vehicle to better navigate driving environments.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
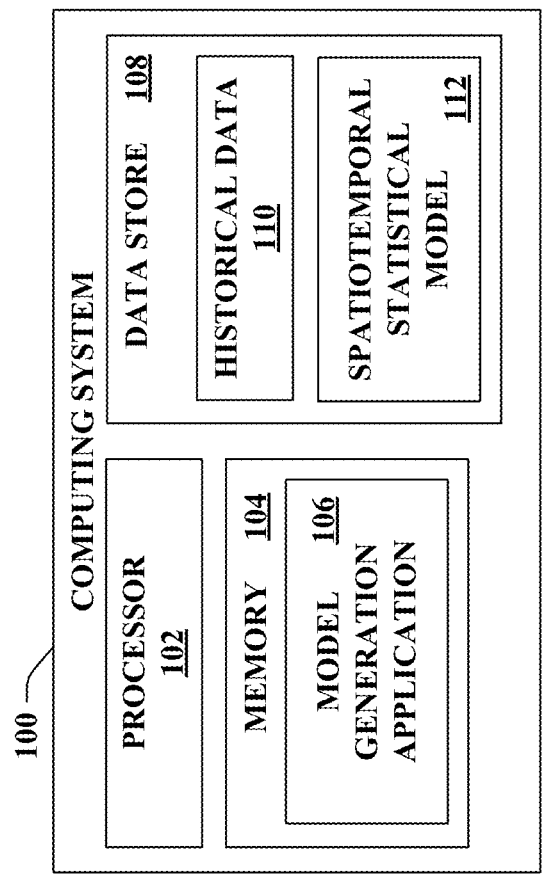
FIG. 1 illustrates a functional block diagram of an exemplary computing system that is configured to construct a spatiotemporal statistical model.

Various technologies pertaining to routing an autonomous vehicle based upon a risk of the autonomous vehicle undergoing an operation-influencing event due to the autonomous vehicle encountering spatiotemporal factors are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component," "application," and "system" are intended to encompass computer-readable data storage that is configured with computer-executable instructions that cause certain functionality to be performed when executed by a processor. The computer-executable instructions may include a routine, a function, or the like. It is also to be understood that a component, application, or system may be localized on a single device or distributed across several devices. Further, as used herein, the term "exemplary" is intended to mean "serving as an illustration or example of something."

With reference now to FIG. 1, an exemplary computing system 100 is illustrated. The computing system 100 includes a processor 102 and memory 104, wherein the memory 104 has a model generation application 106 loaded therein. As will be described in greater detail below, the model generation application 106 (when executed by the processor 102) is configured to generate computer-implemented spatiotemporal statistical models (described below).

The computing system 100 also includes a data store 108. The data store 108 includes historical data 110 from autonomous vehicles when the autonomous vehicles undergo operation-influencing events. As such, the historical data 110 comprises indications of geographic locations traversed by the autonomous vehicles, indications of spatiotemporal factors in the geographic locations, and times at which the autonomous vehicles encountered the spatiotemporal factors.

The operation-influencing events may take many forms. Exemplary operation-influencing events include, but are not limited to: 1) a human operator in an autonomous vehicle taking control of the autonomous vehicle; 2) a remote human operator in an autonomous vehicle taking control of the autonomous vehicle; 3) the autonomous vehicle decelerating rapidly (e.g., the autonomous vehicle has a sensed deceleration that is above a threshold); 4) rapid changes in acceleration or deceleration (such that the autonomous vehicle "jerks"); 5) rapid changes in yaw rates (e.g., a yaw rate of the autonomous vehicle is detected as exceeding a threshold); 6) an autonomous vehicle performing an unplanned maneuver along a route (such as swerving to avoid a large puddle of water along the route when the planned maneuver was to continue straight along an area in which the large puddle of water was located); and 7) the autonomous vehicle coming within a threshold distance of an object. These operation-influencing events correspond to one or more predefined spatiotemporal factors, examples of which are described below.

Exemplary spatiotemporal factors may take many different forms, in terms of how the spatiotemporal factors are modeled as correlating to a likelihood of an operation-influencing event and how the spatiotemporal factors causally relate to a variable of interest.

In terms of how the spatiotemporal factors may enter into a computer-implemented spatiotemporal statistical model, the spatiotemporal factors may be modeled as fixed effects (if the effects of the levels of the spatiotemporal factor are calculated so as to maximize the likelihood of the model) or modeled as random effects (if the effect of the levels of the spatiotemporal factor are calculated so as to maximize the likelihood of the model with shrinkage, i.e., where a predicted effect of a given level of a factor is a weighted sum of the predicted effect of that level, individually, and that of all other levels of that spatiotemporal factor, according to a covariance matrix). These spatiotemporal factors can be related to each other and to the operation-influencing events with other types of models besides a mixed model, e.g. a Gaussian process; the description above in terms of fixed and random effects is intended merely to demonstrate that the spatiotemporal factors may enter into a model in different forms.

In terms of how the spatiotemporal factors causally relate to the predicted variable of interest, the spatiotemporal factors may, for example, interfere with recognition of objects in driving environments of autonomous vehicles, or may interfere with physical progress of the vehicle, for example, by inhibiting freedom of movement of the autonomous vehicles about driving environments. The spatiotemporal factors may occur at or between intersections of roads or other areas in the driving environments of the autonomous vehicles.

Exemplary spatiotemporal factors include but are not limited to the following: 1) existence of emergency vehicles (e.g., fire trucks, police cars, etc.), where the emergency vehicles may be found at a time and location due to a location of a fire station, a police station, etc., due to repeated requests for emergency services at the location, due to established patterns of driving by such vehicles, etc.; 2) existence of steam (whether natural or human-generated, for example, steam emitted from manhole covers); 3) existence double parked vehicles; 4) existence of pedestrians (e.g., pedestrians may be clustered together and may be associated with an increased likelihood of an operation-influencing event because of, for example, presenting an especially challenging visual image to perception systems of the autonomous vehicle in such a way as to be associated with an increased likelihood of possible misidentification by the autonomous vehicle); 5) existence of a high volume of cyclists; 6) existence of a high volume of vehicular traffic; 7) existence of an inclement weather condition (e.g., rain, strong wind, fog) which may affect perception of sensor systems of the autonomous vehicle; 8) existence of debris in a road, such as traffic cones or garbage; 9) lighting conditions primarily caused by a time of day (e.g., bright sunlight, low sunlight, no sunlight, diffuse sunlight), where a lighting condition may affect perception of sensor systems of the autonomous vehicle; 10) lighting conditions primarily caused by man-made objects, such as fluorescent lights from street-illuminating devices and/or artificial signage, where such lighting conditions may affect perception of sensor systems of the autonomous vehicle; 11) vegetation occluding a roadway (e.g., overhanging trees, overhanging vines, etc.); 12) roadway features obstructing sight lines of the autonomous vehicle (e.g., signs in a median of the road, garbage cans, etc.); 13) roadway features that cannot be navigated through without accommodation (e.g., potholes, road construction, sharp turns, intersections with high curvatures, narrow roads, roads without marked center lines, etc.); and 14) high volumes of other autonomous vehicles, which may affect perception of sensor systems of the autonomous vehicle, for example, by lidar systems of the autonomous vehicles interfering with one another. In the historical data 110, the spatiotemporal factors correspond to operation-influencing events.

The times in the historical data 110 may take many forms. In a first example, a time may be a time of day (e.g., 11:00 A.M.). In a second example, the time may be a time of a day of a week (e.g., 11:00 A.M. on a Thursday). In a third example, the time may be a time of day during a month (e.g., 11:00 A.M. on a day in January).

The data store 108 also includes a computer-implemented spatiotemporal statistical model 112 generated by the model generation application 106. The spatiotemporal statistical model 112 may be learned by way of computer-implemented machine learning systems. In general, the spatiotemporal statistical model 112 is configured to take, as input, a location, a time, and a direction of travel of an autonomous vehicle along a candidate route from an origin location to a destination location. The time may be a time of day, a time of a day of a week, or a time of day during a month. The spatiotemporal statistical model 112 is configured to output a score that is indicative of a likelihood that the autonomous vehicle will undergo an operation-influencing event due to the autonomous vehicle encountering a spatiotemporal factor (such as one of the spatiotemporal factors identified above) along the candidate route.

In an embodiment, the computer-implemented spatiotemporal statistical model 112 may be or include a random effects model or a mixed effects model. In another embodiment, the spatiotemporal statistical model 112 may be or include a Bayesian hierarchical model, a random forest model, a Gaussian process model, or a neural network. When the spatiotemporal statistical model 112 comprises a neural network, the neural network may be or include an artificial neural network (ANN), a deep neural network (DNN), a convolutional neural network (CNN), a recurrent neural network (RNN), or another suitable neural network.

In an example, the spatiotemporal statistical model 112 may comprise nodes and edges, wherein the edges couple nodes in the spatiotemporal statistical model 112. Each edge is assigned a learned weight, wherein the learned weight can be learned using a supervised or semi-supervised learning procedure. Accordingly, for instance, a learned weight assigned to an edge can be influenced by the historical data 110.

Operation of the computing system 100 is now set forth. The model generation application 106, utilizing any suitable machine-learning technologies, accesses the historical data 110 and generates the computer-implemented spatiotemporal statistical model 112 based upon the historical data 110. In effect, then, the spatiotemporal statistical model is configured to model causal relationships between operation-influencing events and spatiotemporal factors in a geographic area. Subsequent to generating the spatiotemporal statistical model 112, the model generation application 106 may update the spatiotemporal statistical model 112 when the historical data 110 is updated. Although the model generation application 106 has been described as generating a single spatiotemporal statistical model, it is to be understood that the model generation application 106 may generate many different spatiotemporal statistical models.

Figure 2:
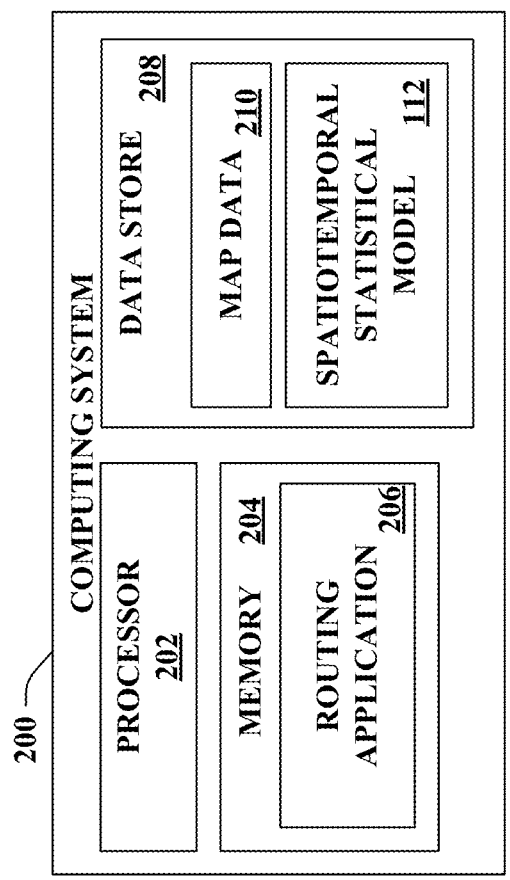
FIG. 2 illustrates a functional block diagram of an exemplary computing system that is configured to identify a route between an origin location and a destination location based upon output of a spatiotemporal statistical model.

Referring now to FIG. 2, an exemplary computing system 200 that is configured to determine a route between an origin location and a destination location is illustrated. The computing system 200 includes a processor 202 and memory 204, wherein the memory 204 has a routing application 206 loaded therein. As will be described in greater detail below, the routing application 206 (when executed by the processor 202) is generally configured to identify a route for an autonomous vehicle to follow from an origin location to a destination location. The routing application 206 may also be configured to identify a route that balances travel time or travel distance of the autonomous vehicle along the route with a risk of the autonomous vehicle undergoing an operation-influencing event due to the autonomous vehicle encountering a spatiotemporal factor.

The computing system 200 may also include a data store 208. The data store 208 comprises map data 210. In general, the map data 210 comprises relatively highly detailed maps of driving environments of autonomous vehicles. For instance, the map data 210 can include locations of roadways, locations of lane boundaries of roadways, locations of stop signs and stop lights along roadways, locations of curbs, locations of storm grates, and so forth. The data store 208 further comprises the spatiotemporal statistical model 112. As will be described in greater detail below, the routing application 206 identifies candidate routes for an autonomous vehicle to follow from an origin location to a destination location based upon the map data 210, a time, and output of the spatiotemporal statistical model.

Figure 3:
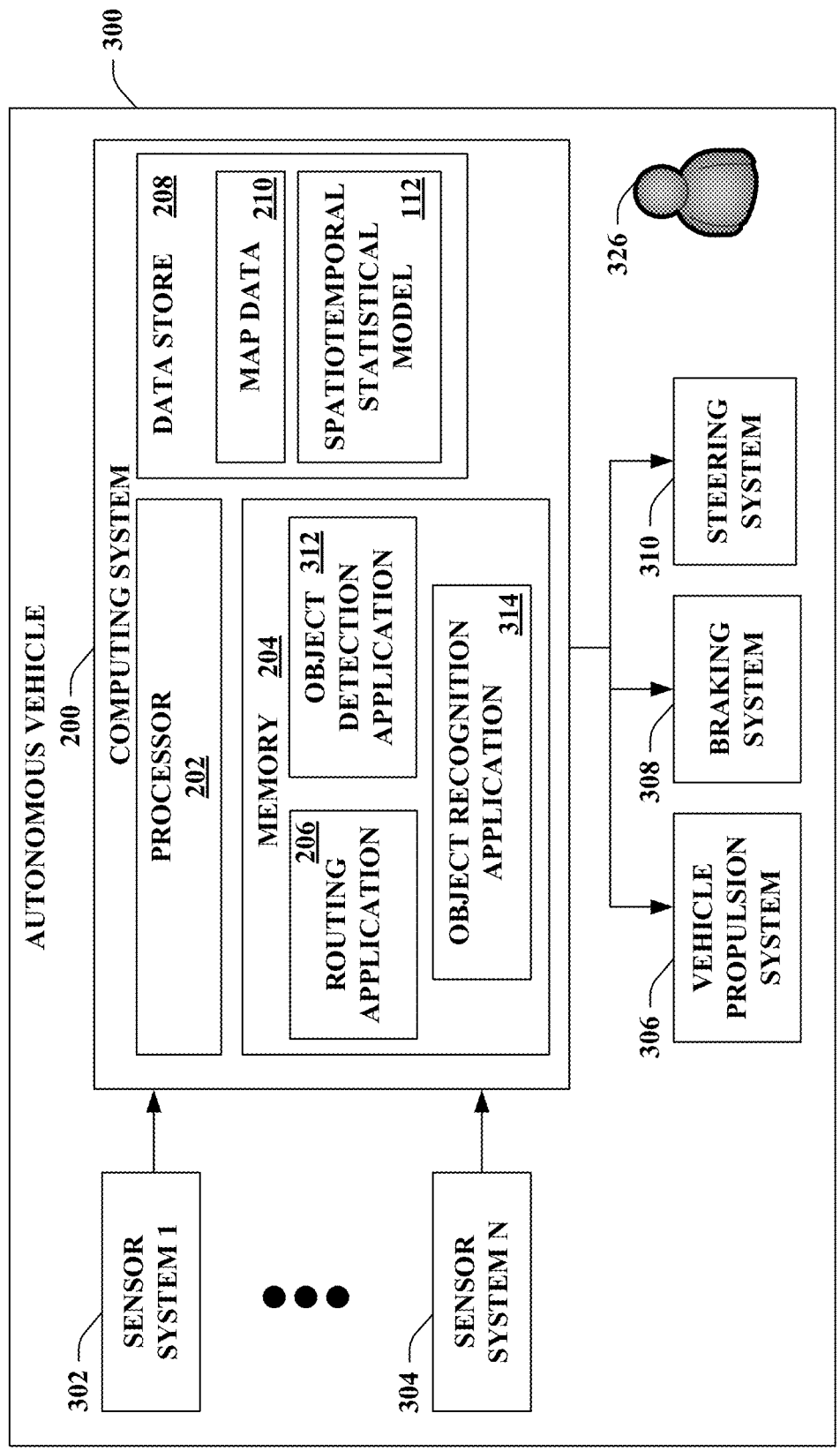
FIG. 3 illustrates a functional block diagram of an exemplary autonomous vehicle that is configured to identify a route between an origin location and a destination location based upon output of a spatiotemporal statistical model.

Turning now to FIG. 3, an exemplary autonomous vehicle 300 is illustrated, wherein the autonomous vehicle 300 is configured to identify a route to travel between an origin location and a destination location. The autonomous vehicle 300 can navigate about roadways without a human operator based upon sensor data (i.e., sensor signals) outputted by sensor systems of the autonomous vehicle 300. The autonomous vehicle 300 includes sensor systems, namely, a first sensor system 1 302 through an Nth sensor system 304. The sensor systems 302-304 are of different types and are arranged about the autonomous vehicle 300. For example, the sensor systems 302-304 can include a lidar sensor system, a camera sensor (image) system, a radar sensor system, a satellite-based radio navigation sensor system (e.g., global positioning system (GPS) sensor systems), a sonar sensor system, an infrared sensor system, an accelerometer, a microphone sensor, and the like. The sensor systems 302-304 generate (i.e., output) sensor data. For instance, the radar sensor system can generate radar sensor data, the lidar sensor system can generate lidar sensor data, the camera sensor system can generate camera sensor data, etc.

The autonomous vehicle 300 further includes several mechanical systems that are used to effectuate appropriate motion of the autonomous vehicle 300. For instance, the mechanical systems can include, but are not limited to, a vehicle propulsion system 306, a braking system 308, and a steering system 310. The vehicle propulsion system 306 may be an electric motor, an internal combustion engine, or a combination thereof. The braking system 308 can include an engine brake, brake pads, actuators, and/or any other suitable componentry that is configured to assist in decelerating the autonomous vehicle 300. The steering system 310 includes suitable componentry that is configured to control the direction of movement of the autonomous vehicle 300.

The autonomous vehicle 300 further comprises the computing system 200. While the computing system 200 is illustrated as being included in the autonomous vehicle 300, it is to be understood that portions of the computing system 200 may reside on a remote computing device that is in communication with the autonomous vehicle. For instance, the routing application 206 and the spatiotemporal statistical model 112 can optionally be executed be a computing system that is remote from the autonomous vehicle 300. In the example illustrated in FIG. 3, the memory 204 of the computing system 200 further includes an object detection application 312, which is configured to receive sensor data output by the sensor system 302-304 and detect when an object in a driving environment of the autonomous vehicle 300 is within a threshold distance of the autonomous vehicle 300 based upon the sensor data. For instance, the object detection system 312 may detect that an object is within the threshold distance from the autonomous vehicle 300 based upon a lidar point cloud generated by a lidar sensor system of the autonomous vehicle 300.

The memory 204 of the computing system can further include an object recognition application 314, wherein the object recognition system 314 is configured to receive the sensor data output by the sensor systems 302 and recognize a type of object from amongst predefined types based upon the sensor data. For instance, the predefined types may include car, truck, bus, bicycle, pedestrian, static object, or unknown. The object recognition system 314 may also be configured to identify empty space in the driving environment of the autonomous vehicle 300.

As illustrated in FIG. 3, the autonomous vehicle 300 may have a human operator 326 that rides in the autonomous vehicle 300. It is contemplated that the autonomous vehicle 300 typically operates autonomously. However, in certain driving scenarios, the human operator 326 may take control over the autonomous vehicle 300. Further, the human operator 326 may release control of the autonomous vehicle 300, such that the autonomous vehicle operates autonomously. In an embodiment, the autonomous vehicle 300 may also include various components (not shown) that enable the autonomous vehicle 300 to be (optionally) operated by the human operator 326. For instance, the components may include a driver seat, a steering wheel, a brake pedal, an acceleration pedal, a gear selector, mirrors, a speedometer, etc. In another exemplary embodiment, a computing system (not shown) can be in remote communication with the autonomous vehicle 300, wherein an operator of the remote computing system can remotely take control of the autonomous vehicle 300 and can additionally release control of the autonomous vehicle 300 (such that the autonomous vehicle 300 returns to operating autonomously).

Operation of the autonomous vehicle 300 is now set forth. The computing system 200 receives an origin location of the autonomous vehicle 300 and a destination location of the autonomous vehicle 300. For instance, the computing system 200 may receive the origin location and the destination location from a computing device operated by a passenger (or future passenger) of the autonomous vehicle 300. Thus, the origin location and/or the destination location may be GPS coordinates. In another example, the origin location and/or the destination location may be street addresses.

Responsive to receiving the origin location and the destination location, the routing application 206 of the computing system 200 may generate candidate routes from the origin location to the destination location based upon the map data 210. The routing application 206, for example, can output a weighted directed graph based upon the candidate routes. The weighted directed graph comprises nodes and directed edges that couple at least some of the nodes. The nodes represent intersections that are traversed by the autonomous vehicle 300 when the autonomous vehicle 300 travels the candidate routes. The directed edges represent roads that connect intersections along the candidate routes. The routing application 206 assigns weights to the directed edges, wherein the weights may be indicative of costs to the autonomous vehicle 300 for traversing the roads and intersections. For instance, a weight assigned to a directed edge in the directed edges can be indicative of an amount of time required for the autonomous vehicle 300 to travel through an intersection. In another example, a weight assigned to a directed edge in the directed edges can be indicative of a distance between intersections.

The routing application 206 may input a location, a time, and direction of travel of the autonomous vehicle 300 along a candidate route between the origin location destination and the destination location to the computer-implemented spatiotemporal statistical model 112. The spatiotemporal statistical model 112 outputs a score based upon the location, the time, and the direction of travel of the autonomous vehicle 300 along the candidate route, wherein the score is indicative of a likelihood that the autonomous vehicle 300 will undergo an operation-influencing event due the autonomous vehicle 300 encountering a spatiotemporal factor (e.g., from amongst the spatiotemporal factors identified above). The routing application 206 may repeat this process for different locations, times, and directions of travel of the autonomous vehicle 300 along candidate routes to generate a score for each location, time, and direction of travel along the candidate route. Further, the routing application 206 may repeat this process as the autonomous vehicle 300 travels, such that candidate routes can be updated, and scores can be updated.

Responsive to the spatiotemporal statistical model 112 outputting a score for an intersection, the routing application 206 updates a weight assigned to a directed edge in the weighted directed graph based upon the score. The routing application 206 can repeat this process for each score generated by the computer-implemented spatiotemporal statistical model 112. In an example, the routing application 206 may increase a weight of an edge that is coupled to a node that represents an intersection when the score for the intersection output by the spatiotemporal statistical model 112 indicates a relatively high likelihood of occurrence an operation-influencing event at the intersection if the autonomous vehicle 300 were to follow the candidate route through the intersection. In another example, the routing application 206 may decrease a weight of an edge that is coupled to a node that represents an intersection when the score for the intersection output by the spatiotemporal statistical model 112 indicates a relatively low likelihood of occurrence of an operation-influencing event at the intersection if the autonomous vehicle 300 were to follow the candidate route through the intersection. Thus, the weights of the directed edges in the weighted directed graph are further based upon the likelihood that the autonomous vehicle 300 will undergo an operation-influencing event due to the autonomous vehicle 300 encountering spatiotemporal factors along the candidate routes.

In an exemplary embodiment, the routing application 206 may identify a route that the autonomous vehicle 300 is to follow from the origin location to the destination location by applying a shortest path algorithm to the weighted directed graph. For instance, the shortest path algorithm may be one of a Dijkstra's algorithm, a Bellman-Ford algorithm, or a Floyd-Warshall algorithm. In an example, the route identified by the routing application 206 between the origin location and the destination location may minimize a likelihood that the autonomous vehicle 300 will undergo an operation-influencing event, while a candidate route that is not selected by the routing application 206 may minimize the travel time from the origin location to the destination location.

When the routing application 206 is executed on a remote computing system, the remote computing system transmits the identified route to the autonomous vehicle 300. The computing system 200 of the autonomous vehicle 300 then controls at least one of the vehicle propulsion system 306, the braking system 308, or the steering system 310 such that the autonomous vehicle 300 follows the route from the origin location to the destination location. Additionally, the autonomous vehicle 300 may additionally utilize sensor data generated by the sensor systems 302-304 in order to follow the route from the origin location to the destination location.

In an embodiment, the routing application 206 can be configured to identify a route that maximizes a likelihood that the autonomous vehicle 300 will undergo an operation-influencing event due to the autonomous vehicle 300 encountering a spatiotemporal factor along the route. This may be advantageous in scenarios in which testing of autonomous vehicles is desirable. The routing application 206 can invert weights assigned to directed edges in the weighted directed graph in order to identify a route that maximizes a likelihood that the autonomous vehicle 300 will undergo the operation-influencing event due to the autonomous vehicle 300 encountering the spatiotemporal factor along the route.

The routing application 206 can overlay the scores output by the computer-implemented spatiotemporal statistical model 112 with the map data 210 in order to generate a heat map. The heat map may comprise representations of a driving environment of the autonomous vehicle 300. A portion of the representation may be marked to indicate the likelihood of the operation-influencing event occurring at an area of the driving environment represented by the heat map.

Further, the routing application 206 can utilize the scores (described above) in order to optimize a loss function (i.e., an objective function). The loss function may be a linear or nonlinear function. The routing application 206 may utilize the loss function in order to identify the route.

In addition, the routing application 206 can specify a loss function that incorporates a business objective into a set of constraints. For example, the routing application 206 can utilize the loss function to identify a route that minimizes a likelihood of the autonomous vehicle 300 undergoing an operation-influencing event while increasing the travel time from the origin location to the destination location by no more than 5 minutes. A business objective may be incorporated into a set of constraints utilized by the routing application 206.

The routing application 206 may specify a loss function that directly incorporates a business objective (i.e., a business priority). For example, the routing application 206 can utilize the loss function to identify a route that minimizes a weighted sum of a likelihood of the autonomous vehicle 300 undergoing an operation-influencing event in addition to the estimated time to arrival to the destination location. A business objective may be incorporated directly into a loss function utilized by the routing application 206.

Still further, the routing application 206 can generate parametric tradeoff curves for each of the candidate routes based upon the scores and costs assigned to the candidate routes. The routing application 206 may generate the parametric tradeoff curves based upon one or more business objectives as well.

Figure 4:
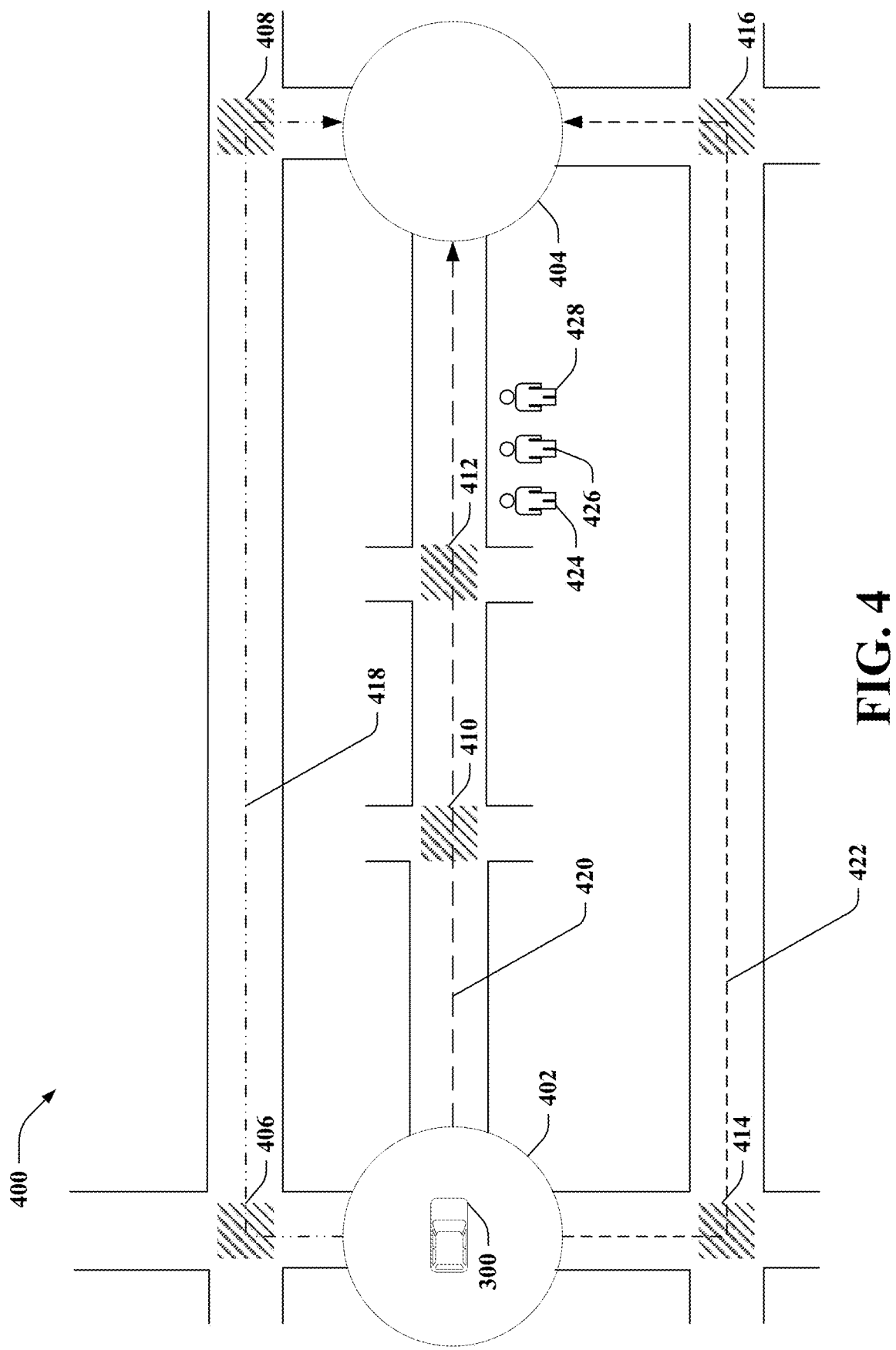
FIG. 4 is a schematic that illustrates potential routes between an origin location and a destination location.

FIGS. 4-8 illustrate a specific example of operation of the systems and methods described above. Referring now to FIG. 4, an exemplary driving environment 400 is illustrated. The driving environment 400 includes the autonomous vehicle 300 described above. As illustrated in FIG. 4, the autonomous vehicle 300 is initially located at an origin location 402 in the driving environment 400. In this example, the autonomous vehicle 300 is to traverse the driving environment 400 such that the autonomous vehicle 300 arrives at the destination location 404.

The driving environment 400 includes a first candidate route 418 from the origin location 402 to the destination location 404, a second candidate route 420 from the origin location 402 to the destination location 404, and a third candidate route 422 from the origin location 402 to the destination location 404 (collectively, "the candidate routes 418-422"). The first candidate route 418 includes a first intersection 406 and a second intersection 408 that are traversed by the autonomous vehicle 300 when the autonomous vehicle 300 follows the first candidate route 418. The second candidate route 420 includes a third intersection 410 and a fourth intersection 412 that are traversed by the autonomous vehicle 300 when the autonomous vehicle 300 follows the second candidate route 420. The third candidate route 422 includes a fifth intersection 414 and a sixth intersection 416 that are traversed by the autonomous vehicle 300 when the autonomous vehicle 300 follows the third candidate route 422. As shown in FIG. 4, the candidate routes 418-422 may vary in length. For instance, the first candidate route 418 may be a longer distance from the origin location 402 to the destination location 404 than the second candidate route 422.

The driving environment 400 includes a plurality of pedestrians 424-426 (e.g., a spatiotemporal factor). The plurality of pedestrians 424-426 are closely clustered around the fourth intersection 412.

Figure 5:
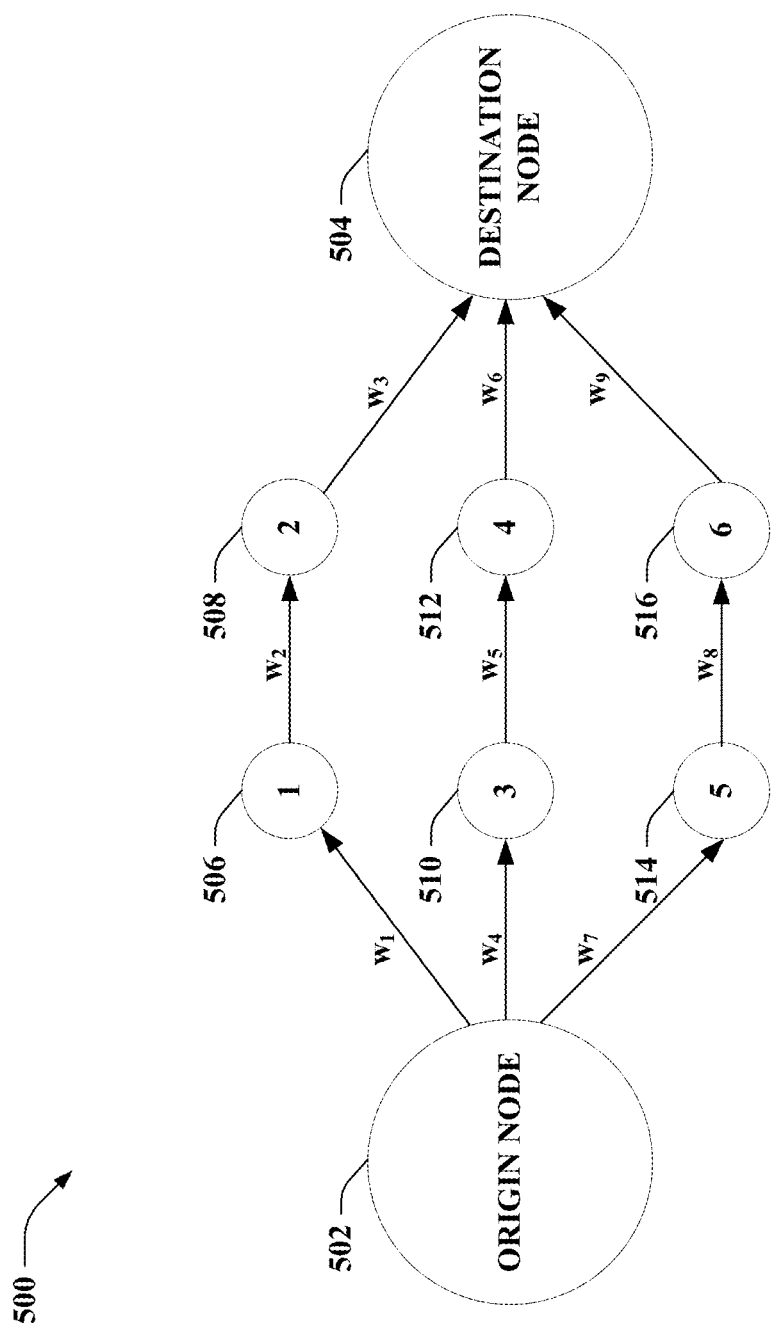
FIG. 5 is a schematic that illustrates a weighted directed graph that corresponds to the potential routes depicted in FIG. 7.

Turning now to FIG. 5, an exemplary weighted directed graph 500 is illustrated. The routing application 206 can generate the weighted directed graph 500 based upon the map data 210. The weighted directed graph 500 is based upon the driving environment 400 illustrated in FIG. 4.

As such, the weighted directed graph 500 includes an origin node 502 assigned to the origin location 402 of the autonomous vehicle 300 and a destination node 504 assigned to the destination location 404 of the autonomous vehicle 300. The weighted directed graph 500 additionally includes a first node 506, a second node 508, a third node 510, a fourth node 512, a fifth node 514, and a sixth node 516 (collectively, "the nodes 506-516"). Each node in the nodes 506-516 represents an intersection in the intersections 406-416. For instance, the first node 506 represents the first intersection 406, the second node 508 represents the second intersection 408, and so forth.

The weighted directed graph 500 further includes directed edges (indicated by arrows in FIG. 5), wherein each directed edge couples two nodes in the graph 500. Each directed edge in the directed edges represents a path (i.e., a road) that connects an intersection in the driving environment 400 to another intersection in the driving environment 400, the origin location 402 to an intersection in the driving environment 400, or an intersection in the driving environment 400 to the destination location 404. Each directed edge is assigned a weight in weights $w_1$ to $w_9$, wherein the weight is indicative of the cost (e.g., a time cost, a distance cost, etc.) to the autonomous vehicle 300 in selecting a route that passes through an intersection in the intersections 406-416 of the driving environment. For instance, the weights $w_1$ to $w_3$ are indicative of a cost to the autonomous vehicle 300 in selecting the first candidate route 418 for the autonomous vehicle 300 to traverse from the origin location 402 to the destination location 404.

Figure 6:
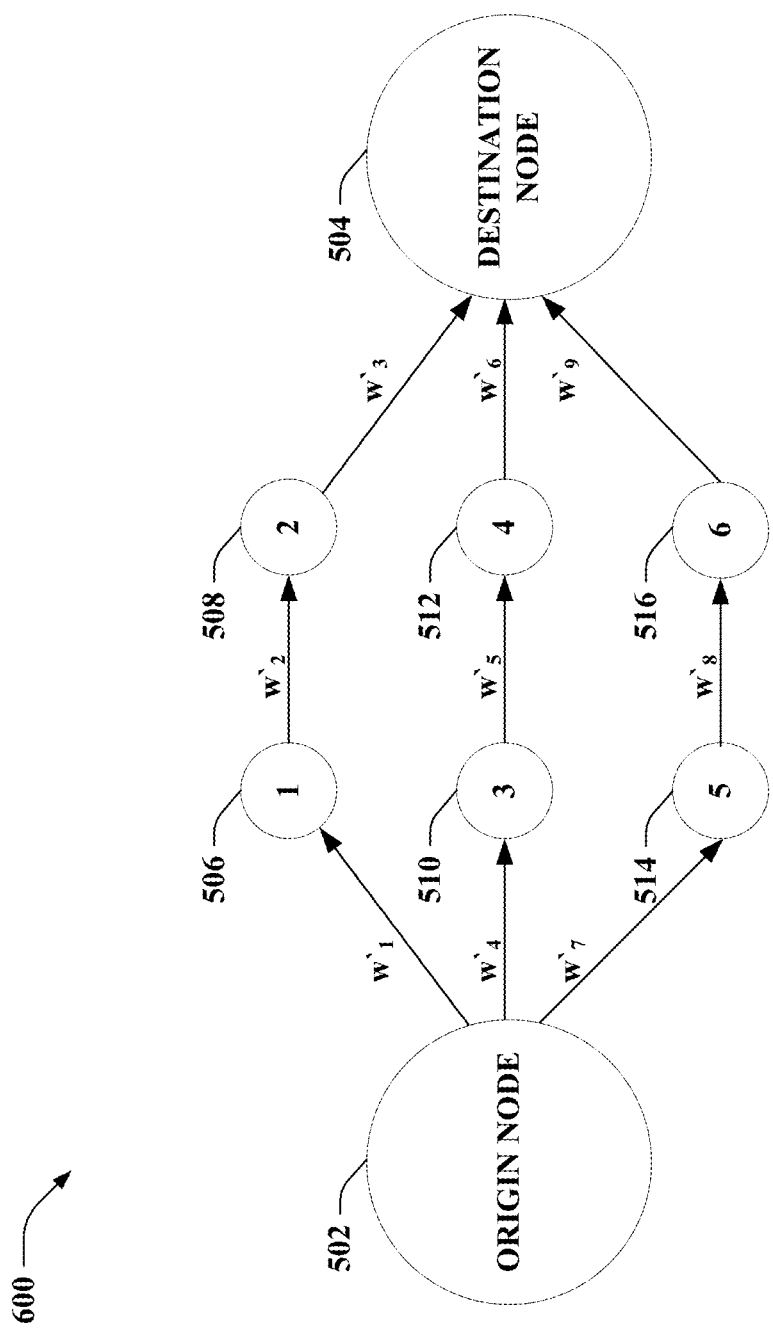
FIG. 6 is a schematic that illustrates another weighted directed graph that corresponds to the potential routes depicted in FIG. 7.

With reference now to FIG. 6, an exemplary weighted directed graph 600 is illustrated. The routing application 206 generates the weighted directed graph 600. The weighted directed graph 600 includes the origin node 502, the destination node 504, the nodes 506-516, and the directed edges depicted in FIG. 5. However, as shown in FIG. 6, the routing application 206 has modified each of the weights $w_1$ to $w_9$ to generate modified weights $w'_1$ to $w'_9$, respectively, thereby generating the weighted directed graph 600. Each of the modified weights $w'_1$ to $w'_9$ is based upon one or more scores (described above) output by the spatiotemporal statistical model 112. For instance, the weight $w'_5$ may be based upon both a travel time (or a travel distance) cost assigned to the fourth intersection 412 as well as a likelihood that the autonomous vehicle 300 will undergo an operation-influencing event near the fourth intersection 412 due to spatiotemporal factors (e.g., the plurality of pedestrians 424-428).

Figure 7:
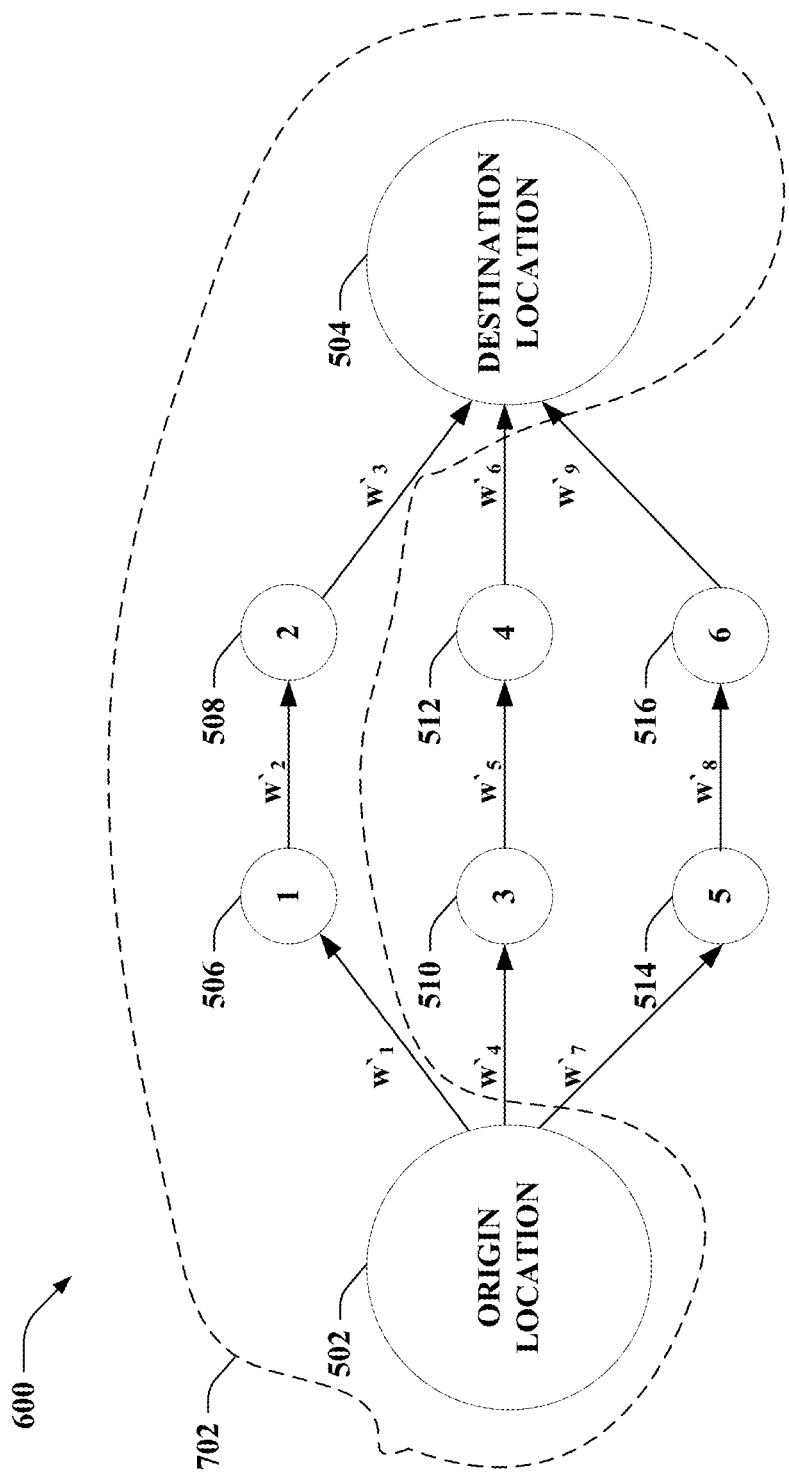
FIG. 7 is a schematic that illustrates selection of a route from amongst a plurality of potential routes based upon weights assigned to edges of a weighted directed graph.

Referring now to FIG. 7, a shortest path 702 (illustrated via dotted lines in FIG. 7) through the weighted directed graph 600 shown in FIG. 6 is illustrated. The routing application 206 determines the shortest path 702 through the graph by applying a shortest path algorithm to the weighted directed graph 600. For instance, the shortest path algorithm may be one of a Dijkstra's algorithm, a Bellman-Ford algorithm, or a Floyd-Warshall algorithm.

As shown in FIG. 7, the shortest path 702 includes the first node 506 and the second node 508 (as well as the origin node 502 and the destination node 504). Thus, the shortest path 702 may correspond to the first candidate route 418 depicted in FIG. 4. Notably, the first candidate route 418 may not be the shortest route (from a time or a distance perspective) in the driving environment 400. Rather, the routing application 206 can identify the first candidate route 418 as the route to follow as the first candidate route 418 has the lowest cost to the autonomous vehicle 300 when likelihood of the autonomous vehicle 300 undergoing an operation-influencing event due to the autonomous vehicle 300 encountering a spatiotemporal factor (e.g., the plurality of pedestrians 724-728) is additionally considered along with travel time or travel distance of the autonomous vehicle 300.

Figure 8:
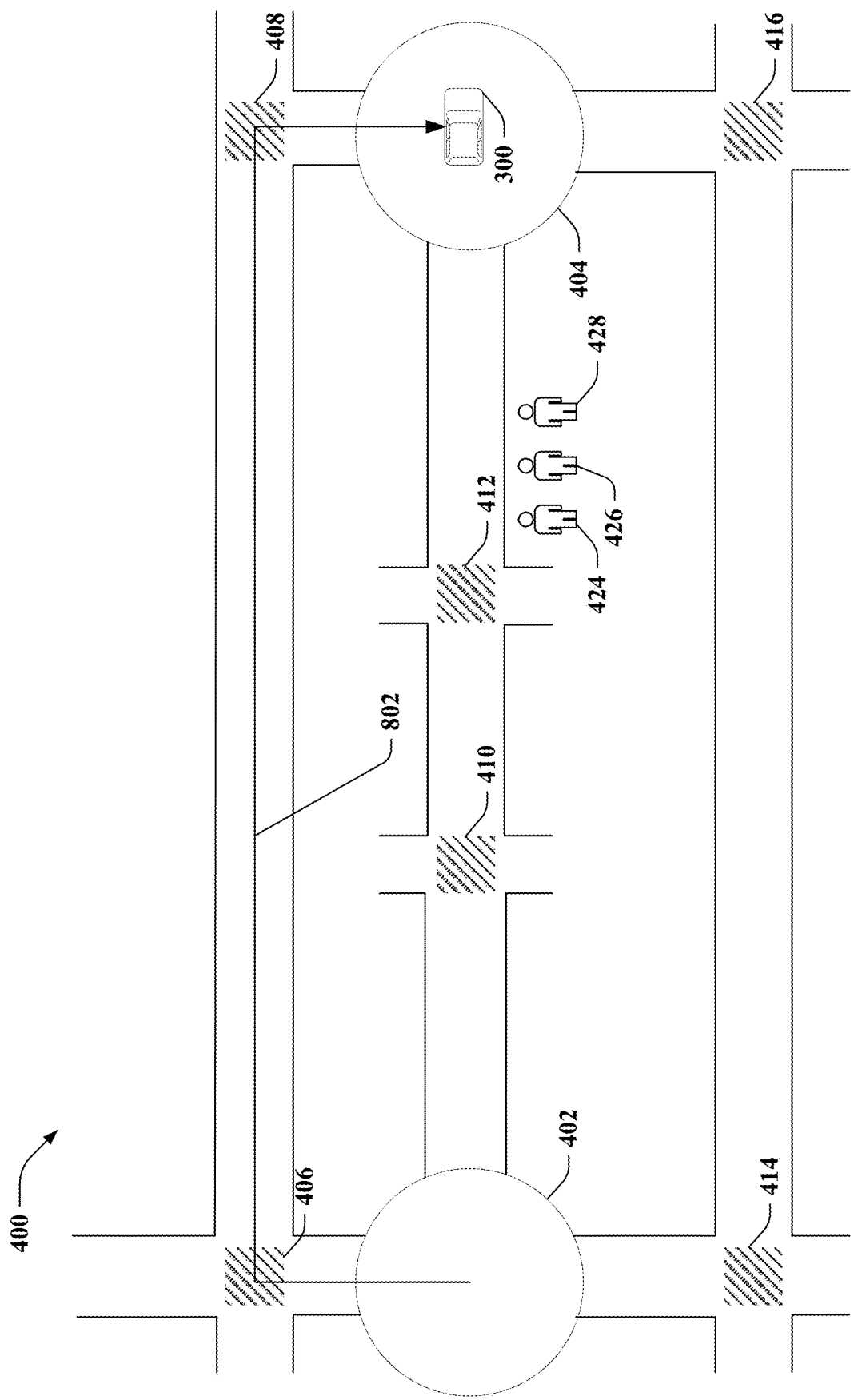
FIG. 8 is a schematic that illustrates the autonomous vehicle travelling along one of the potential routes depicted in FIG. 7.

Turning now to FIG. 8, an updated view of the driving environment 400 depicted in FIG. 4 is illustrated. After the routing application 206 determines the shortest path 702 through the weighted directed graph 600, the autonomous vehicle 300 may base its operation on the shortest path 702. More specifically, as the shortest path 702 includes the first node 506 (which represents the first intersection 406) and the second node 508 (which represents the second intersection 408), the autonomous vehicle 300 may control at least one of the vehicle propulsion system 306, the braking system 308, or the steering system 310 such that the autonomous vehicle 300 follows the first candidate route 418 (now referred to as "the route 802") from the origin location 402 through the first intersection 406 and the second intersection 408 in order to arrive at the destination location 404.

Figure 9:
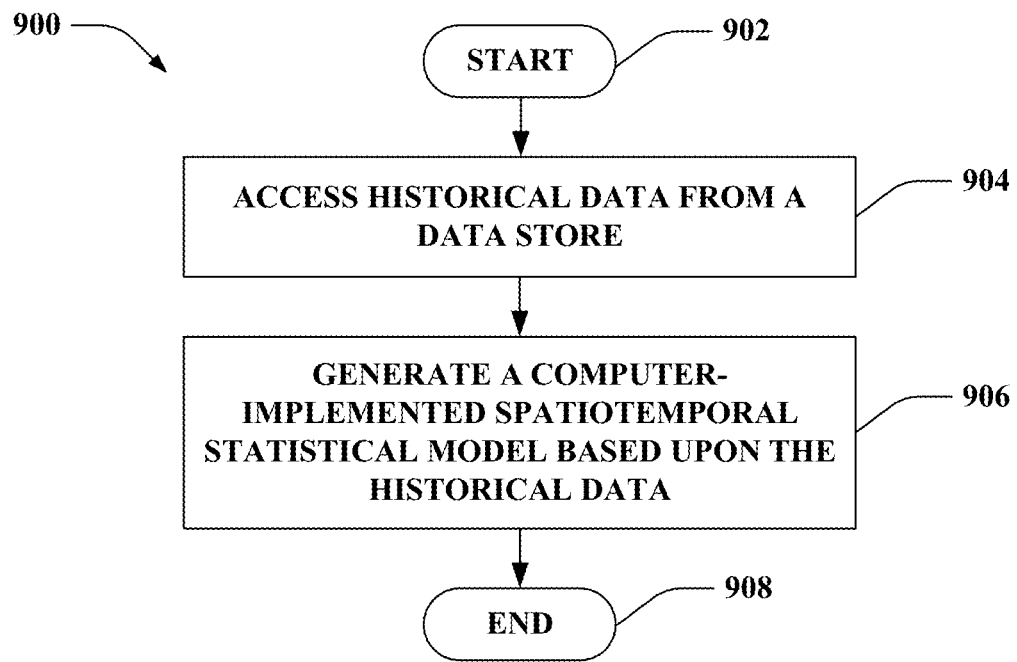
FIG. 9 is a flow diagram that illustrates an exemplary methodology for generating a spatiotemporal statistical model that, when generated, is configured to output a score that is indicative of a likelihood that the autonomous vehicle will undergo an operation-influencing event.
Figure 10:
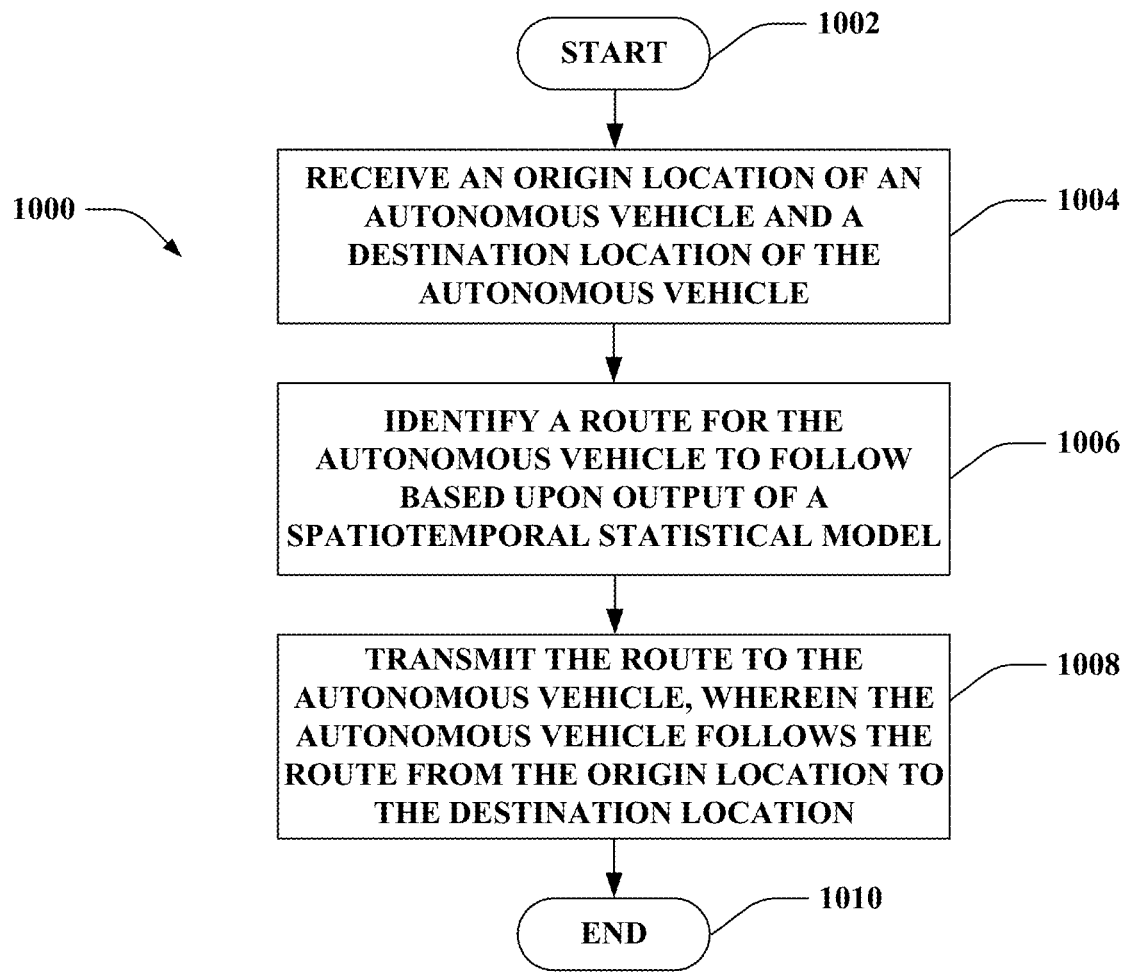
FIG. 10 is a flow diagram that illustrates an exemplary methodology for identifying a route for an autonomous vehicle to follow from an origin location to a destination location.
Figure 11:
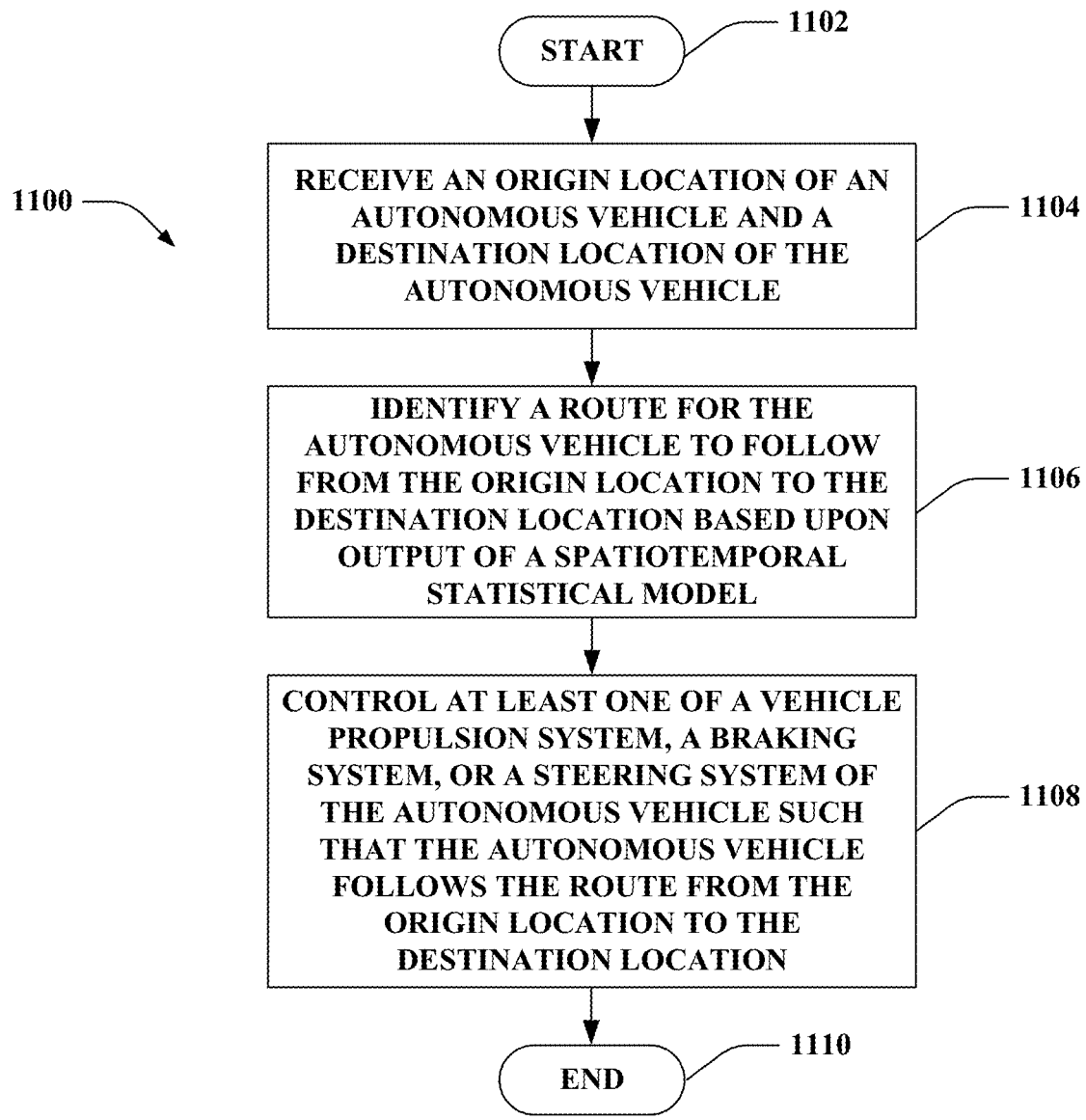
FIG. 11 is a flow diagram that illustrates an exemplary methodology for identifying and following a route from an origin location to a destination location.

FIGS. 9-11 illustrate exemplary methodologies relating to routing an autonomous vehicle based upon a risk of the autonomous vehicle undergoing an operation-influencing event due to the autonomous vehicle encountering spatiotemporal factors along a route. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference to FIG. 9, a methodology 900 performed by a computing system for generating a spatiotemporal statistical model that outputs a score indicative of a likelihood that the autonomous vehicle will undergo an operation-influencing event is illustrated. The methodology 900 begins at 902, and at 904 the computing system accesses historical data from a data store. The historical data comprises indications of geographic locations traversed by autonomous vehicles, indications of spatiotemporal factors in the geographic locations when the autonomous vehicles undergo operation-influencing events, and times at which the autonomous vehicles encountered the spatiotemporal factors.

At 906, the computing system generates a computer-implemented spatiotemporal statistical model based upon the historical data. The spatiotemporal statistical model takes, as input, a location, a time, and a direction of travel of an autonomous vehicle along a candidate route. The spatiotemporal statistical model is configured to output a score that is indicative of a likelihood that the autonomous vehicle will undergo an operation-influencing event due to the autonomous vehicle encountering a spatiotemporal factor along the candidate route. The methodology 900 concludes at 908.

Turning to FIG. 10, a methodology 1000 performed by a computing system for identifying a route for an autonomous vehicle to follow from an origin location to a destination location is illustrated. The methodology 1000 begins at 1002, and at 1004, the computing system receives an origin location of an autonomous vehicle and a destination location of the autonomous vehicle.

At 1006, the computing system identifies a route for the autonomous vehicle to follow based upon output of a spatiotemporal statistical model. The spatiotemporal statistical model takes, as input, a location, a time, and a direction of travel of an autonomous vehicle along a candidate route. The output of the spatiotemporal statistical model is a score that is indicative of a likelihood that the autonomous vehicle will undergo an operation-influencing event due to the autonomous vehicle encountering a spatiotemporal factor along the candidate route. The computing system identifies the route based in part on the score.

At 1008, the computing system transmits the route to the autonomous vehicle over a network. The autonomous vehicle then follows the route from the origin location to the destination location. The methodology 1000 concludes at 1010.

With reference to FIG. 11, a methodology 1100 performed by an autonomous vehicle for identifying and following a route from an origin location to a destination location is illustrated. The methodology 1100 begins at 1102, and at 1104, the autonomous vehicle determines an origin location of the autonomous vehicle and a destination location of the autonomous vehicle.

At 1106, the autonomous vehicle identifies a route for the autonomous vehicle to follow based upon output of a spatiotemporal statistical model. The spatiotemporal statistical model takes, as input, a location, a time, and a direction of travel of the autonomous vehicle along a candidate route. The output of the spatiotemporal statistical model is a score that is indicative of a likelihood that the autonomous vehicle will undergo an operation-influencing event due to the autonomous vehicle encountering a spatiotemporal factor along the candidate route. The autonomous vehicle identifies the route based in part on the score.

At 1108, the autonomous vehicle controls at least one of a vehicle propulsion system of the autonomous vehicle, a braking system of the autonomous vehicle, or a steering system of the autonomous vehicle such that the autonomous vehicle follows the route from the origin location to the destination location. The methodology 1100 concludes at 1110.

Figure 12:
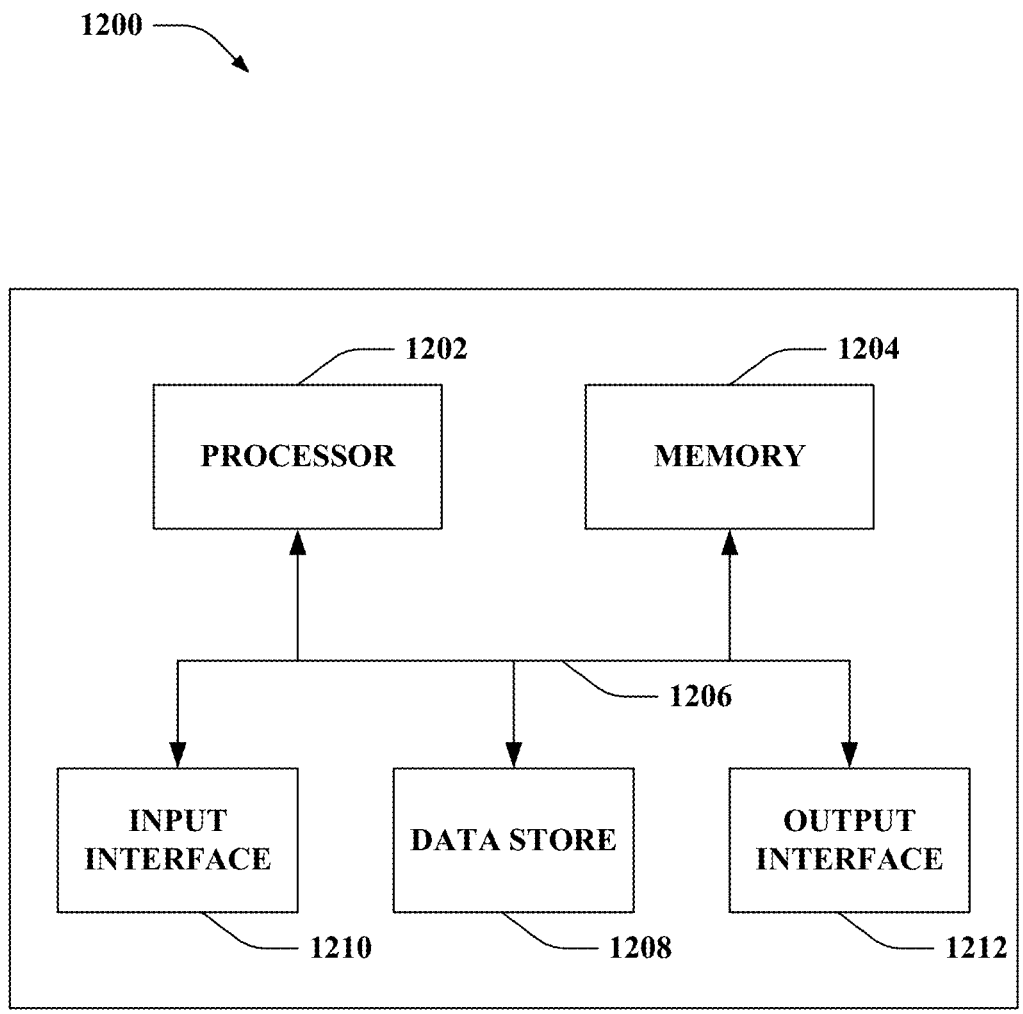
FIG. 12 illustrates an exemplary computing device.

Referring now to FIG. 12, a high-level illustration of an exemplary computing device 1200 that can be used in accordance with the systems and methodologies disclosed herein is illustrated. For instance, the computing device 1200 may be or include the computing system 100 or the computing system 200. The computing device 1200 includes at least one processor 1202 that executes instructions that are stored in a memory 1204. The instructions may be, for instance, instructions for implementing functionality described as being carried out by one or more systems discussed above or instructions for implementing one or more of the methods described above. The processor 1202 may be a graphics processing unit (GPU), a plurality of GPUs, a central processing unit (CPU), a plurality of CPUs, a multi-core processor, etc. The processor 1202 may access the memory 1204 by way of a system bus 1206. In addition to storing executable instructions, the memory 1204 may also store historical data, computer-implemented spatiotemporal statistical models, weighted directed graphs, etc.

The computing device 1200 additionally includes a data store 1208 that is accessible by the processor 1202 by way of the system bus 1206. The data store 1208 may include executable instructions, historical data, computer-implemented spatiotemporal statistical models, weighted directed graphs, etc.

The computing device 1200 also includes an input interface 1210 that allows external devices to communicate with the computing device 1200. For instance, the input interface 1210 may be used to receive instructions from an external computer device, etc. The computing device 1200 also includes an output interface 1212 that interfaces the computing device 1200 with one or more external devices. For example, the computing device 1200 may transmit control signals to the vehicle propulsion system 306, the braking system 308, and/or the steering system 310 by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, cellular, and microwave, then the coaxial cable, fiber optic cable, twisted pair, DSL, or wireless technologies such as infrared, radio, cellular, and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising:
   a processor; and
   memory that stores computer-readable instructions that, when executed by the processor, cause the processor to perform acts comprising:
   receiving an origin location of an autonomous vehicle and a destination location of the autonomous vehicle; and
   identifying a route for the autonomous vehicle to follow from the origin location to the destination location based upon outputs of a computer-implemented spatiotemporal statistical model for candidate routes from the origin location to the destination location, wherein the spatiotemporal statistical model is generated based upon historical data from autonomous vehicles when the autonomous vehicles undergo operation-influencing events in a driving environment such that the autonomous vehicles discontinue operating autonomously, wherein the historical data comprises indications of geographic locations traversed by the autonomous vehicles, indications of spatiotemporal factors in the geographic locations when the autonomous vehicles undergo the operation-influencing events, and times at which the autonomous vehicles encountered the spatiotemporal factors, wherein the spatiotemporal factors comprise conditions in the driving environment that interfere with at least one of object recognition by the autonomous vehicles or physical progress of the autonomous vehicles causing the autonomous vehicles to discontinue operating autonomously, wherein the spatiotemporal statistical model takes, as input, a location, a time, and a direction of travel of the autonomous vehicle along a candidate route between the origin location and the destination location, wherein an output of the spatiotemporal statistical model for the candidate route is a score that is indicative of a likelihood that the autonomous vehicle will undergo an operation-influencing event due to the autonomous vehicle encountering a spatiotemporal factor in the spatiotemporal factors along the candidate route, wherein the autonomous vehicle follows the route from the origin location to the destination location responsive to the computing system identifying the route.

2. The computing system of claim 1, wherein the operation-influencing event is the autonomous vehicle being caused by a human operator to transition from operating autonomously to operating based upon input from the human operator due to the autonomous vehicle encountering the spatiotemporal factor.

3. The computing system of claim 1, wherein the operation-influencing event is:
   a deceleration value of the autonomous vehicle exceeding a threshold deceleration value due to the autonomous vehicle encountering the spatiotemporal factor;
   a yaw rate of the autonomous vehicle exceeding a threshold yaw rate due to the autonomous vehicle encountering the spatiotemporal factor; or
   the autonomous vehicle detecting that the autonomous vehicle has come within a threshold distance from an object due to the autonomous vehicle encountering the spatiotemporal factor.

4. The computing system of claim 1, wherein the operation-influencing event is a second computing system operated by a remote human operator taking control of the autonomous vehicle over a network due to the autonomous vehicle encountering the spatiotemporal factor.

5. The computing system of claim 1, wherein the operation-influencing event is the autonomous vehicle being caused to perform an unplanned maneuver due to the autonomous vehicle encountering the spatiotemporal factor.

6. The computing system of claim 1, wherein the computing system transmits the route to the autonomous vehicle over a network, thereby causing the autonomous vehicle to follow the route from the origin location to the destination location.

7. The computing system of claim 1, wherein the spatiotemporal factor is at least one of:
an incidence of a double-parked vehicle in the driving environment of the autonomous vehicle; or
an incidence of an emergency vehicle in the driving environment of the autonomous vehicle.

8. The computing system of claim 1, the acts further comprising:
generating a heat map based upon the score and a map of the driving environment of the autonomous vehicle, wherein the heat map comprises a representation of the driving environment, wherein a portion of the representation is marked to indicate the likelihood of the operation-influencing event occurring at an area of the driving environment represented by the heat map.

9. The computing system of claim 1, wherein the spatiotemporal factor is at least one of:
a plurality of pedestrians located along a portion of the candidate route; or
a plurality of cyclists located along the portion of the candidate route.

10. The computing system of claim 1, wherein the computing system is comprised by the autonomous vehicle, wherein the autonomous vehicle further comprises:
a vehicle propulsion system;
a braking system; and
a steering system,
wherein the autonomous vehicle controls at least one of the vehicle propulsion system, the braking system, or the steering system in order to follow the route from the origin location to the destination location.

11. The computing system of claim 1, the acts further comprising:
prior to identifying the route for the autonomous vehicle to follow from the origin location to the destination location based upon the outputs of the spatiotemporal statistical model, receiving the historical data; and
generating the spatiotemporal statistical model based upon the historical data.

12. The computing system of claim 1, wherein the spatiotemporal factor is an incidence of a volume of vehicular traffic along the candidate route.

13. A method executed by a processor of a computing system, the method comprising:
receiving an origin location of an autonomous vehicle and a destination location of the autonomous vehicle;
identifying a route for the autonomous vehicle to follow from the origin location to the destination location based upon outputs of a computer-implemented spatiotemporal statistical model for candidate routes from the origin location to the destination location, wherein the spatiotemporal statistical model is generated based upon historical data from autonomous vehicles when the autonomous vehicles undergo operation-influencing events in a driving environment such that the autonomous vehicles discontinue operating autonomously, wherein the historical data comprises indications of geographic locations traversed by the autonomous vehicles, indications of spatiotemporal factors in the geographic locations when the autonomous vehicles undergo the operation-influencing events, and times at which the autonomous vehicles encountered the spatiotemporal factors, wherein the spatiotemporal factors comprise conditions in the driving environment that interfere with at least one of object recognition by the autonomous vehicles or physical progress of the autonomous vehicles causing the autonomous vehicles to discontinue operating autonomously, wherein the spatiotemporal statistical model takes, as input, a location, a time, and a direction of travel of the autonomous vehicle along a candidate route between the origin location and the destination location, wherein an output of the spatiotemporal statistical model for the candidate route is a score that is indicative of a likelihood that the autonomous vehicle will undergo an operation-influencing event due to the autonomous vehicle encountering a spatiotemporal factor in the spatiotemporal factors along the candidate route; and
transmitting the route to the autonomous vehicle, wherein the autonomous vehicle follows the route from the origin location to the destination location responsive to receiving the route.

14. The method of claim 13, wherein the spatiotemporal factor is located at an intersection along the candidate route.

15. The method of claim 13, wherein the spatiotemporal factor is at least one of:
an incidence of an inclement weather condition along the candidate route;
an incidence of steam along the candidate route;
an incidence of debris in a roadway along the candidate route;
an incidence of vegetation along the candidate route that obstructs sight lines of the autonomous vehicle; or
an incidence of roadway features that obstruct sight lines of the autonomous vehicle.

16. The method of claim 13, wherein the spatiotemporal factor is at least one of:
first lighting conditions caused by a time of day; or
second lighting conditions caused by man-made objects.

17. An autonomous vehicle comprising:
a vehicle propulsion system;
a braking system;
a steering system; and
a computing system that is in communication with the vehicle propulsion system, the braking system, and the steering system, wherein the computing system comprises:
a processor; and
memory that stores computer-readable instructions that, when executed by the processor, cause the processor to perform acts comprising:
receiving an origin location of an autonomous vehicle and a destination location of the autonomous vehicle;
identifying a route for the autonomous vehicle to follow from the origin location to the destination location based upon outputs of a computer-implemented spatiotemporal statistical model for candidate routes from the origin location to the destination location, wherein the spatiotemporal statistical model is generated based upon historical data from autonomous vehicles when the autonomous vehicles undergo operation-influencing events in a driving environment such that the autonomous vehicles discontinue operating autonomously, wherein the historical data comprises indications of geographic locations traversed by the autonomous vehicles, indications of spatiotemporal factors in the geographic locations when the autonomous vehicles undergo the operation-influencing events, and times at which the autonomous vehicles encountered the spatiotemporal factors, wherein the spatiotemporal factors comprise conditions in the driving environment that interfere with at least one of object recognition by the autonomous vehicles or physical progress of the autonomous vehicles causing the autonomous vehicles to discontinue operating autonomously, wherein the spatiotemporal statistical model takes, as input, a location, a time, and a direction of travel of the autonomous vehicle along a candidate route between the origin location and the destination location, wherein an output of the spatiotemporal statistical model for the candidate route is a score that is indicative of a likelihood that the autonomous vehicle will undergo an operation-influencing event due to the autonomous vehicle encountering a spatiotemporal factor in the spatiotemporal factors along the candidate route; and controlling at least one of the vehicle propulsion system, the braking system, or the steering system to cause the autonomous vehicle to follow the route from the origin location to the destination location.

18. The autonomous vehicle of claim 17, wherein the spatiotemporal factor is an incidence of other autonomous vehicles along the candidate route.

19. The computing system of claim 1, wherein the route for the autonomous vehicle to follow is further identified based on travel times for traveling along the candidate routes.

20. The autonomous vehicle of claim 17, wherein the route for the autonomous vehicle to follow is further identified based on travel times for traveling along the candidate routes.

* * * * *